April 7, 1970   R. F. STEWART ET AL   3,505,520
MEASURING THE INCOMBUSTIBLE CONTENT OF MINE DUST USING
BACKSCATTER OF LOW ENERGY GAMMA RAYS
Filed Oct. 10, 1967   2 Sheets-Sheet 1

INVENTORS
ROBERT F. STEWART
JOSEPH W. MARTIN

BY *Ernest P. Cohen*
*Gersten Sadowsky*
ATTORNEYS

United States Patent Office 3,505,520
Patented Apr. 7, 1970

3,505,520
MEASURING THE INCOMBUSTIBLE CONTENT OF MINE DUST USING BACKSCATTER OF LOW ENERGY GAMMA RAYS
Robert F. Stewart, Morgantown, and Joseph W. Martin, Cassville, W. Va., assignors to the United States of America as represented by the Secretary of the Interior
Filed Oct. 10, 1967, Ser. No. 674,358
Int. Cl. G01n 21/26, 23/12; H01j 37/00
U.S. Cl. 250—43.5
6 Claims

ABSTRACT OF THE DISCLOSURE

Low energy gamma radiation directionally applied in a method, and by an adjustable apparatus to a layer of mine dust produces scattered gammas whose reflected radiation detected at a predetermined distance from the mine dust acts to cause the generation of an electrical control input for a meter indicating the incombustible content of the mine dust substantially independently of the effects on such indicating which are normally due to its bulk density and any moisture content thereof.

Figure 1:
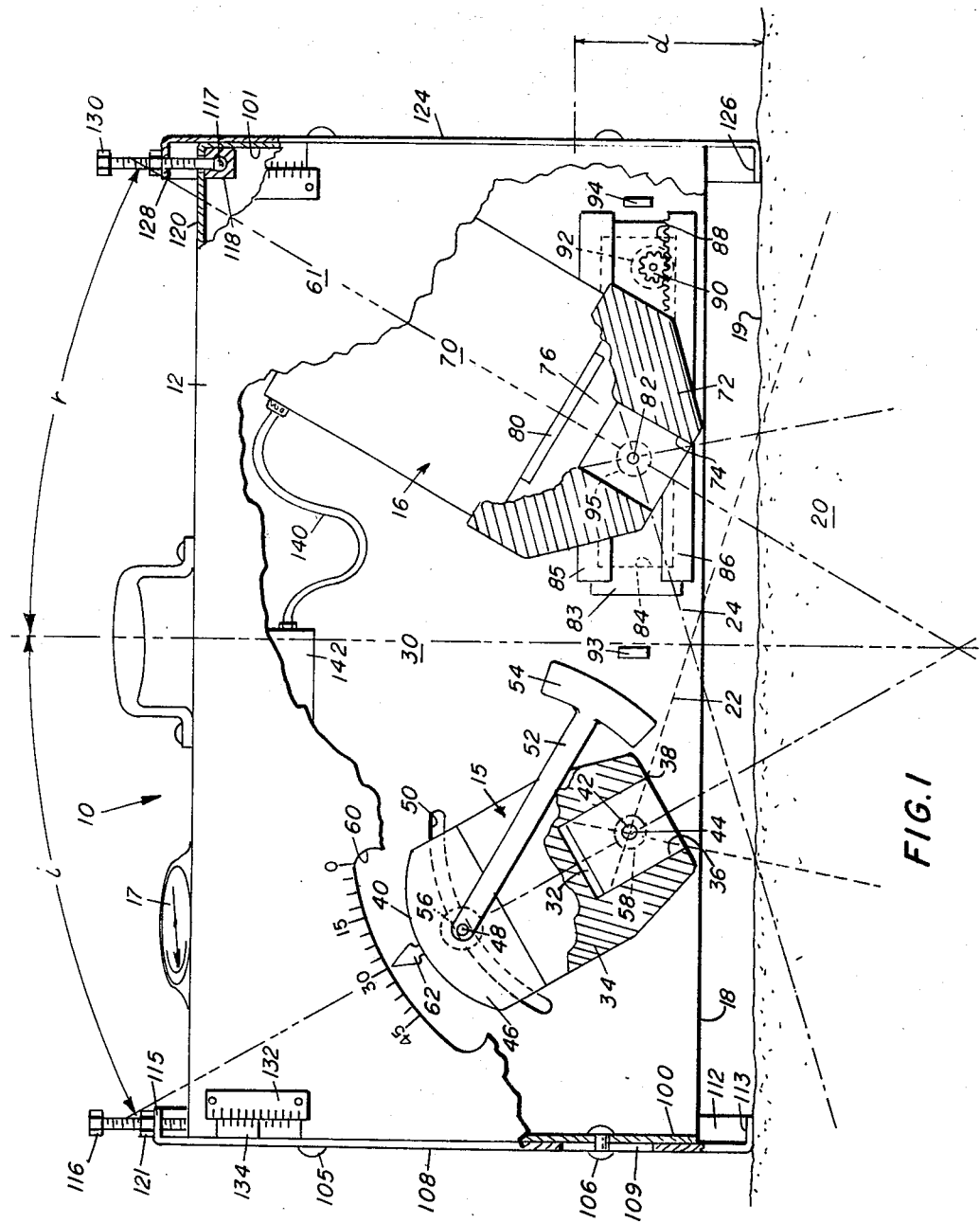

This invention resulted from work done by the Bureau of Mines of the U.S. Department of the Interior, and the domestic title to the invention is in the Government.

The invention relates to a method and apparatus for finding the incombustible content of fine particulate matter, such as mine dust. Backscatter from low energy radiation applied in accordance with the invention is detected in a predetermined manner for deriving data respecting incombustible content. More particularly, the invention facilitates a reliably useful and economical determination of the percentage content of incombustibles in the substance of mine dust without sampling and chemical analysis. Layers of mine dust containing more than 35 percent combustible material are known to propagate explosions in coal mines. Rock dust such as powdered limestone is usually added to the top inch of the dust accumulated on mine floors to reduce the possibility of mine explosions. Since routine inspections of this top inch to determine its incombustible contents are readily accomplished by the invention, hazardous conditions in mines can be discovered in time to take remedial measures, and work to further improve rock dusting techniques promoting safety in mines is simplified.

Methods and apparatus utilizing backscattered radiation procedures heretofore applied to learn of the mineral or moisture contents of dusts and other granular substances are generally unsatisfactory for directly measuring incombustibles in mine dusts. Moisture and bulk density variations, which are characteristic properties of such substances, affect the rate of backscattered radiation in an indeterminable manner. As a result, merely detecting the rate of radiation activity does not normally obtain meaningful data without supplementary determinations also being made for moisture content or bulk density to provide compensatory data with which to correct basic readings. Making such moisture and density analyses may employ methods disclosed in Patent No. 2,781,453, granted Feb. 12, 1957, to Belcher et al., which describes as substitutes for conventional weighing and measuring procedures, density determinations by gamma radiation and detection of backscattered gamma rays, and moisture determinations by fast neutron radiation and detection of backscattered slow neutrons and gamma rays. Conducting such further analyses is avoided by means of the present invention which obtains by a singular direct determination requisite data on the incombustible contents of mine dusts.

The present invention adopts as essential parts thereof certain operational conditions relating to the strength of the radiation source, and a number of predetermined cooperative relationships defining the physical arrangement of the source with respect to the detector, and of these two components with respect to the surface of the zone of mine dust being examined. Particularly significant in these relationships is the geometry thereof constituted by a spacing between the gamma ray source and detector and the aforesaid zone surface which allows a measurement of the backscattered radiation independently of variations in the bulk density of the mine dust. Neglect of this factor makes consistently accurate determinations impossible since bulk density of mine dust varies widely with changes in particle size, composition, moisture, and compaction, whic hare conditions not readily controllable. Compensation for the effect of moisture variations on the bulk density also follows from such relationships wherein the aforementioned spacing is appropriately modified.

Since mine safety consideration are normally satisfied by an analysis of a relatively thin outer layer of mine dust, a source of low energy gamma radiation is used to advantage in the invention as applied in mines. One of the aforesaid predetermined relationships advantageously applicable under these conditions involves the angular separation between the detector and the radiation source that effectively eliminates adjustments in the detector's calibration curve control which would otherwise become necessary to compensate for varying compositions of dust layers. Spacing between the radiation source and the detector is thereby also made relevant to obtain a more useful calibration curve which approaches a straight line.

An object of the present invention is therefore to provide a nuclear analysis method for directly measuring the incombustible contents of mineral dusts.

Another object of the invention is to provide a predetermined arrangement of gamma radiation and detection devices in an apparatus for measuring the incombustible contents of mineral dusts.

Figure 2:
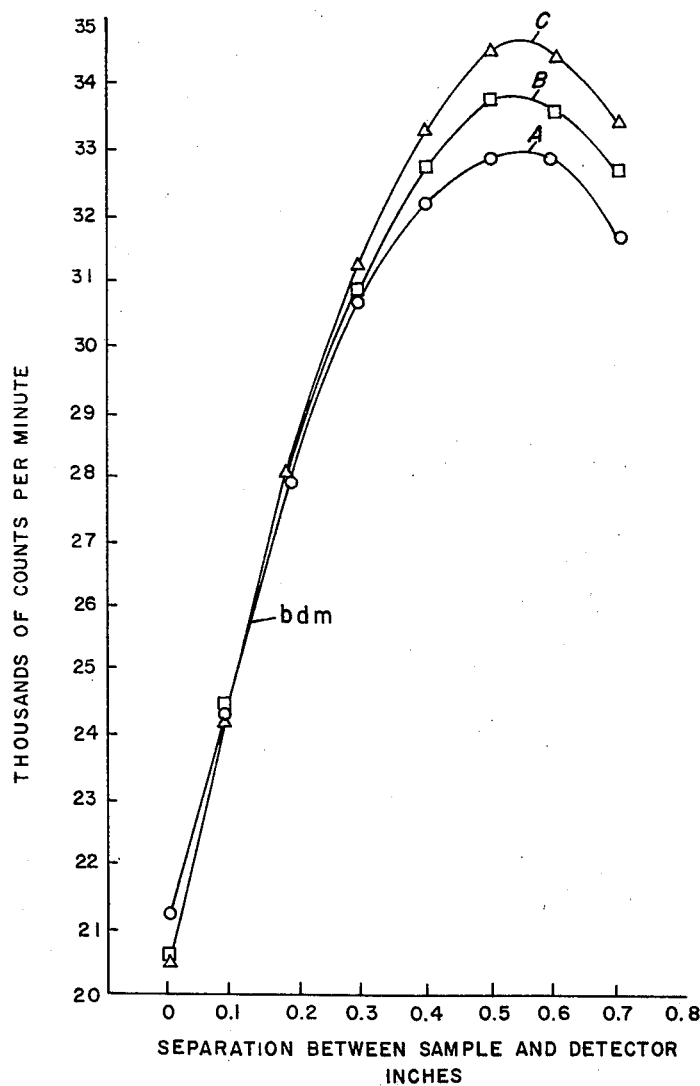

In order that the present invention may be more clearly understood, reference will now be made to the accompanying drawing in which:

FIG. 1 is an elevational view, partially in section, illustrating one embodiment of an apparatus according to the invention; and FIG. 2 is a graphical representation relating backscattered gamma count rate to the distance between a detector and the mine dust probed thereby, and indicating the distance at which variations in density do not affect the count rate.

FIG. 1 shows an apparatus according to the invention as a portable instrument 10, whose compact form readily adapts it for service in close and awkward places, such as a mine shaft or tunnel. A rugged, metal casing 12 is provided to house the instrument's principal operational components, including a radiation source unit 15, a backscatter radiation detector unit 16, and a pulse rate indicator meter 17. Instrument 10 in operative position locates a bottom opening 18 of its casing 12 to face an exposed surface 19 of a dust layer 20 selected for analysis of its calcium content and other incombustibles therein. Arranged thusly in casing 12, source unit 15 disposed at a predetermined angle of incidence $i$ directs a cone of gamma radiation within the dotted lines 22 for penetrating layer 20 to an appropriate depth, and detector unit 16 disposed at a predetermined probing angle $r$ detects attenuated backcattered radiation presented within a conical zone defined by dot-dash lines 24.

Source and detector units 15 and 16 are each supported in operative positions by bearing elements located in the lower part of a side wall 30 of casing 12. The bearing elements are suitably spaced apart on wall 30 to accommodate the functioning of these units within a predetermined range of adjustments thereof. Source unit 15 houses a gamma ray emitting material 32 in a block-like enclosure constituting a radiation shield 34. Source material 32 is affixed at the inner end of a tubular recess 36 in a projecting face 38 of shield 34. A relatively broad, plate-like member 40, providing an adjustable carrier for shield 34, has attached thereto a stub shaft 42 which extends through wall 30 in a bushing 44 constituting one of the aforesaid spaced-apart bearing elements. Shield 34 is securely fastened to a bracket part of plate member 40 from which a substantial segment 46 of the member extends above the shield. A further shaft 48 supported by a bearing in a central opening of segment 46, passes through an arcuate slot 50 in wall 30 so as to project an end outside of casing 12, and extends over shield 34 so as to suitably locate the other end thereof for receiving as an attachment thereto a pivotal arm 52 from which depends a shield cover 54. A knob 56 secured to the outside end of shaft 48 is manipulatable between terminal positions defined by conventional lock stops, such as ball-detents, whereby shaft 48 is adjusted to replace or remove cover 54 from over recess 36 in shield face 38. A further knob 58, secured to the end of shaft 42 outside wall 30, is manipulatable against the restraint of position check means (not shown), to span approximately a 45 degree angle, whereby plate member 40 is angularly adjusted about the axis of shaft 42 to appropriately dispose source unit 15 with respect to casing bottom 18. Vertical angular adjustments can be read on an indicial window 60 in a side wall 61 of casing 12, by means of a pointer 62 attached to the rim of plate segment 46.

Combined to form detector unit 16 are a photomultiplier-scintillant assembly 70 and a detector-collimator member 72. A block of lead, tungsten, or other radiation absorbing material used in making collimator member 72, is fashioned as a windowed cap by a cylindrical axial orifice 74 entering from a projecting end thereof, and a relatively shallow, wide recess 76 joining the orifice from the opposite end thereof. The container housing the photomultiplier components is fastened within recess 76 so as to generally enclose a scintillant material 80, carried on the container contiguous to a light sensitive means of the photomultiplier, to face the passage defined by orifice 74. Scintillant material 80 is thus positioned for activation by the impinging backscattered radiation traveling through orifice 74 which determines the photomultiplier output controlling the operation of count rate indicator meter 17. A detailed disclosure of assembly 70, meter 17, and the requisite connections between such parts are not given since this structure is constituted of only conventional means well known in the related art. Detector unit 16 is adjustably mounted in casing 12 by means of a stub shaft 82 affixed in the substance of collimator 72, and supported by a bearing element in a carrier plate 83. A longitudinally extended rectangular opening 84 in wall 30, has affixed alongside the longer edges thereof within casing 12, further extended channel-like track members 85 and 86. Carrier plate 83 is maintained slidably supported in these tracks whereby it covers opening 84 in overlapping relationship therewith. A toothed portion of the upper edge of lower track 86 constitutes a rack 88 with which a pinion gear 90 is operatively engaged. A stub shaft of gear 90 is rotatably supported in a bearing secured in a carrier plate 83. A knob 92 affixed to the gear shaft extending outside casing 12, is manipulatable to roll gear 90 on rack 88 whereby carrier plate 83 is longitudinally shiftable wtih respect to wall 30, in either of two opposite directions, to position detecting unit 16 a predetermined distance from source unit 15 within limits defined by stops 93 and 94 projecting from wall 30 into the path of the carrier plate. A manipulatable knob 95 secured to an end of shaft 82 projecting from plate 83 and outside casing 12, facilitates angular adjustments of detector unit 16 within an arc of 45 degrees. Conventional check means on carrier plate 83 holds the detector unit in a position of adjustment. Means provided to indicate the angular setting of detector unit 16 includes a pointer mark suitably inscribed on knob 95 and associated with indicia on carrier plate 83 in an obvious manner. Knob 92 also has associated therewith indicia means (not shown), which indicates directly the distance separating detector unit 16 from source unit 15.

Further adjustment means are associated with casing 12 by connections to its end panels 100 and 101, to facilitate spacing the detector material 80 from the dust layer surface 19 a predetermined distance $d$. Rivets 105 and 106, visible in FIG. 1, are representative of four such rivets retained in holes symmetrically arranged in side panel 100. A measurably longer plate 108 formed with a corresponding symmetrical arrangement of four vertical narrow slots, exemplified by slot 109, wherein the rivets are effective to maintain the plate slidable engaged with panel 100, and restrained to a limited vertical displacement with respect to the panel. A shoulder flange 112 extending around three edges of plate 108 defines a base or footing strip 113, which supports apparatus 10 at one end thereof spaced above the dust layer, and a header strip 115 by means of which the plate is given its limited displacement. Thumb screw 116 represents one of two adjusting screws engaging threads in holes spaced apart on header strip 115, and which have ball ends 117 rotatable in sockets 118 made integral with the inner side of a cover panel 120 of casing 12. A lock nut 121 is operable on each adjusting screw to compress header strip 115 on the screw threads to fix the adjustment in a well known manner.

A similar structural configuration operable in connection with casing end panel 101, includes a slotted plate 124 constrained by four rivets to a limited displacement with respect to the panel. A footing strip 126 defined by the lower flange part of plate 124, spacially supports apparatus 10 at its other end, and a related header strip 128 has operative therein two thumbscrews, such as screw 130, for adjusting the plate as required. It should be evident from the description heretofore given, that plates 108 and 124 are readily settable by the header strip thumbscrews to adjust the distance $d$ by moving footing strips 113 and 126 to or from the geometric center of detector material 80. Attached to side wall 61 near each of the opposite ends thereof is a graduated scale 132, whose markings are readable to indicate the aforesaid adjustment by reference to a pointer on a vernier member 134 affixed to each plate on the plain edge thereof.

Radiation source material 32 is a radioisotope producing essentially mono-energetic low energy gamma rays preferably energies below 100 kev. Exemplary sources are I–125 (27 and 35 kev.), and Am–241 (39 and 60 kev.) However, particularly useful in the invention is an alpha X-ray source in which an alpha-emitting radioisotope, such as polonium-210, is plated with suitable metal, such as molybdenum, to produce a sharp peak of characteristic X-rays of approximately 17.5 kev. from alpha excitation of the molybdenum. One form of the source applicable in unit 15 is a one-half inch disk with a 5 mil beryllium window and a 2 mil aluminum encapsulation. Detector material 80 can be thin crystals of anthracene or sodium iodide which take the form of one inch disks ranging from 1 mm. to 6 mm. in thickness. Such thin scintillation crystals give good resolution in the low energy range without appreciable detection of higher unwanted radiation, and reduce background count and shielding requirements.

The detector crystals function in a well known manner by interacting with incident gamma photons to produce light whose intensity is proportional to the energy of the absorbed photons. The photomultiplier tube in unit 16 produces an output of current pulses that are proportional to the corresponding light pulses from detector material 80. Shielding furnished by the substance of collimator member 72 absorbs all gamma rays except those entering by way of orifice 74 of the collimator. The photomultiplier output of current pulses representative of the photons detected by unit 16, is made available on a flexible cable 140 to meter circuitry in an enclosure 142. This circuitry operates as an integrating mechanism, or a pulse integrating device which controls the indication of rate meter 17 constituting an integral part thereof. Applicable circuitry and devices are described on pages 45 to 48 of Radioisotope Techniques by Overman and Clark, published by McGraw-Hill Book Company, New York (1960). Energizing power for the detector-meter circuitry can be supplied from batteries stored in compartments affixed to the side walls of the apparatus, or carried as back or belt packs by the operator of the apparatus.

Meaningful measurements of percentage incombustibles contained in mine dust are obtained in accordance with the present invention as a result of steps taken therein to overcome adverse effects upon such measurements due to unpredictable variations in bulk density and moisture characterizing different kinds of mine dust. Generally considered, the flux or field of gamma backscattering from high density materials is greater than that from low density materials. Thus, differing bulk density conditions of mine dust, having substantially uniform percentages of incombustibles, would make obtaining consistently uniform indications of such percentages by usual gamma backscattering measurement techniques virtually impossible. Further, the bulk density of mine dust varies widely with differences in particle size, composition and moisture, factors which are ordinarily not determinable under conditions prevailing when measurements for incombustible contents of mine dust are made in situ.

It is known that improved density determinations by gamma backscattering methods can be secured where consideration is given to special characteristic effects density has upon reflected gamma emissions. Patent No. 3,270,203, granted Aug. 30, 1966, to J. G. Crump, indicates that a decrease of density produces decreased gamma scatterback due to greater penetration of gamma rays at points symmetrically disposed between the emitting source and the detector of reflected gamma emission, which cancels an increase of detection due to additional gamma radiation penetrating less dense material to reach points closer to the detector. Reference is also made to the disposition of the source and detector arrangement at a height or distance above the surface of the material being tested, which gives a maximum detector response, but a minimum sensitivity. Accordingly, in a density monitoring apparatus for use on bulk materials carried on a fast moving conveyor belt, described in the patent, a loss of sensitivity resulting from a need for spacing the source and detector arrangement sufficiently above the moving material to avoid damage thereto, was counteracted by a relatively close spacing of the source and detector. On the other hand, advantages following from the present invention are based partly on obtaining data indications by gamma detection which are independent of differences in bulk density. Routine use of the invention in testing mine dust for its content of incombustibles requires gamma radiation penetration of no more than one inch into any such dust layer. Since mine dust is usually compacted to varying degrees within an outer one inch layer thereof, the significant diminution of the bulk density factor effect by the present invention permits a consistent accuracy in all determinations of the incombustible content of this dust made by means of the invention.

Tests made on a great variety of mine dusts have led to the discovery that there is a distance at which the source and detector is separated from the dust layer surface when it is possible to measure backscattered radiation very nearly independently of any differences in the bulk density within the layer, or as between several different dust layers. This separation distance at which changes in compaction or bulk density has a minimum effect on the backscatter measurement is designated the bulk density minimum of the apparatus. FIG. 2 shows the change in count rate with increasing separation distance of the detector from the dust layer surface for three exemplary dust layers containing 65 percent incombustible mixtures, but which have significantly different densities. The count rate responses with increasing distance from these layers are indicated by curves A, B, and C, representing low to high densities of 0.84 to 0.94, and 1.09 gms./cm.$^3$, respectively. In general, the curves illustrate that higher density mixtures produce higher count rates as the separation distance increases. However, it is evident that there is a bulk density minimum value (BDM) of 0.125 inch whereat the same count is produced for all three densities. By maintaining apparatus 10 at the requisite BDM, the reading corresponding thereto can serve as a base count for purposes of calibrating meter 17 to give direct readings of percentage incombustibles. A specific value of BDM is empirically determinable for each change in detector angle and separation distance between detector and source. Nevertheless, it should be obvious that additional testing of the apparatus to determine further relationships between BDM values and pertinent angles and separation distances would establish a significant range of such values which could facilitate requisite adjustments of the apparatus in a rapid, coordinated manner enabling an even more convenient utilization thereof.

Provision is made in the present invention which enables it to measure the incombustible contents of mine dusts differing substantially as to their constituent substances, and the proportionate compositions of these substances. Since much of the difference in backscatter among different mine dusts whose incombustible contents are substantially alike would be due to the influence of gamma energies below 15 kev., therefore only suitable low energy source materials between 15 and 60 kev. are used in the invention, as was previously indicated. Moreover, where small angles of incidence and reflection are used to measure different mine dusts having like incombustible contents, the resulting backscatter detections differ as to their rates which may also vary disproportionately over any extended range of values. Consequently, relatively large angles are set between the source and detector to reduce to a minimum such operational drawbacks. Use of the embodiment of the invention as shown in FIG. 1, requires only that knobs 58 and 95 be suitably adjusted for setting such angles. For example, where a 65 percent incombustible mixture is considered, and a 0.125 inch separation between the source-detector units and the sample is applicable, 30-degree source and detector angles are used, and the source to detector separation would be one inch measured from the center of the source aperture to the center of the detector aperture. Other arrangements of this structure would be used where the sizes of the source holders and detector shieldings, and apertures therein, are different. The thickness of the dust layer of interest is also considered in selecting optimum angles of incidence and reflection since at large angles the count rate approaches a steady representative value at greater thicknesses. Possible discrepancies due to an insufficiently thick layer of dust are avoided by the use of a low energy gamma source of the type previously described.

In connection with optimum angular settings, consideration is also given to providing suitable distances between source and detector for improving calibration characteristics of the data indicator means such as meter 17 in FIG. 1. The use of relatively larger distances makes possible a closer approach to a calibration curve approximating a straight line relationship. For example, a requisite distance can be set in the FIG. 1 apparatus by the means thereof including carrier plate 83, and rack drive 88, 90, and 92, provided therefor. As is well known in the art, such linear calibration curves require only that the meter be rezeroed with each rock dust to permit its use with a wide range of rock dusts. For this purpose samples of rock dusts of interest are analyzed as references to which the meter can be calibrated as required by adjustments made to movable scales associated with the meter indicia means, or an electrical load constituting part of the meter circuitry. Furthermore, since the bulk density minimum also varies with changes in the angular disposition of the source and detector, any such angular changes requires an empirical determination of the corresponding bulk density minimum.

Actual mine dusts contain varying amounts of moisture which constitute inconstant incombustibles. Therefore, in order to determine the significant invariable incombustible content, provision is made in the invention to compensate for variations in moisture content of the dust layer when it is examined since the error will be approximately the amount of incorporated moisture. As moisture in any given volume of the dust increases from zero to approximately six percent, the effective volume at constant mass produces a decrease in the bulk density of the material. Since the electron density is proportional to the bulk density and the counting rate of detected gammas is proportional to the electron density, it follows that the tendency in effect is for this counting rate to decrease as the bulk density decreases. On the other hand, as moisture increases the total attenuation coefficient $\mu_t$ increases, or since $\mu_t = \mu_a + \mu_s$ where $\mu_a$ is the absorption coefficient and $\mu_s$ is the scattering coefficient and since water is predominately a scattering agent, the tendency in this respect is for the count rate to increase. Should the bulk density decrease in approximately the same proportion as the scattering coefficient increases, the effective change in count rate would be insignificantly small. However, nullification of the bulk density factor by taking measurements at the bulk density minimum, as was heretofore explained, would exclude possible compensation of the moisture content's scattering effect by the decrease in bulk density due to such moisture content. Therefore, in order to permit this bulk density change due to moisture content to be effective as a compensating factor, measurements are not actually taken at the bulk density minimum but at a point displaced a small distance therefrom.

It has been determined that in a case such as was previously considered where 0.125 inch is the bulk density minimum, a suitable operating point would be at a distance of 0.4 inch from the surface of the dust layer. The introduction of this small and tolerable error in the case of dry mine dust, compensates for a much larger error if the dust contains moisture. The setting of a requisite distance when using the FIG. 1 apparatus, is facilitated by positioning footing strips 113 and 126, in the manner heretofore described. As a net result incombustible contents can be measured within five percent and as high as one percent of the actual incombustible contents on all types of mine dusts containing less than six percent moisture since the aforesaid relationships are generally characteristic of such dusts having up to six percent moisture. Above six percent moisture not only the scattering coefficient but also the bulk density increases. Although for mine dusts in mines containing more than six percent moisture accuracy is lost, such wet dusts do not usually constitute an explosive hazard in the mine.

Further reasonable variations and modifications are possible within the scope of the foregoing disclosure and the appended claims to the invention.

What is claimed is:

1. A gamma radiation-backscattering detection method for determining the significant invariable incombustible content of a relatively thin layer of mine dust containing moisture, said layer including a zone in situ characterized by an outer surface, comprising the steps of irradiating said zone with gamma radiation having energy not less than 15 kev. and not exceeding 60 kev., wherein said radiation is applied to said zone at a distance of approximately 0.4 inch from said outer surface and at a predetermined angle of incidence thereto, and detecting gamma rays backscattered from said irradiated zone at a corresponding angle of reflection and where the source of radiation and the place of detection are approximately one inch apart for securing thereby a measurement of the rate of said backscatter, whereby said moisture content of said mine dust and the bulk density thereof oppositely influence the backscatter rate such that the backscattered gamma rays detected give rise to a rate measurement which when related to predetermined backscattered gamma rays rate data respecting the invariable incombustibles of said zone of mine dust provides a significant representation of the incombustible content of said relatively thin layer of mine dust.

2. The method of claim 1 wherein said moisture content does not exceed approximately 6 percent of said environment.

3. An apparatus for measuring the incombustible contents of particulate material comprising a casing defined by a pair of side walls, a pair of end walls, and a cover member situated opposite an opening in said casing, a radiation source unit, a backscatter radiation detection unit, first and second adjustable means rotatably borne in first and second apertures spaced apart on one of said side walls, a bracket plate affixed to said first adjustable rotatable means, a radiation shield block having a recess in one face thereof extending deeply within said block, said block being secured to a major portion of said bracket plate in a manner directing said one face thereof at said casing opening, a relatively low energy radiation source material attached at the extended end of said recess, said backscatter radiation detection unit including at one end thereof a shielding cap having a passageway extending therethrough and a photomultiplier means secured in said shielding cap, a scintillant material attached to said photomultiplier and facing the interior opening of said passageway, said shielding cap being affixed to said second adjustable rotatable means in a manner directing the exterior opening of said passageway at said casing opening, separate manipulatable means affixed to portions of said first and second adjustable rotatable means, respectively, extending outside said casing, count rate meter means calibrated to indicate percentage incombustible contents, having indicia thereon viewable outside said casing through a window in said casing cover member, electrical means mounted in said casing adjacent said meter, including circuitry supplying an electrical output from said photomultiplier to said meter, and slidable means adjustably operable on surfaces of said pair of casing end walls to set a predetermined distance between said scintillant means and surface of said particulate material on which said apparatus is brought to bear.

4. The apparatus of claim 3 wherein an extended opening in said one of said side walls is covered over by a laterally displaceable plate having formed therein said second aperture, whereby said plate is operable to laterally displace said backscatter radiation detector unit with respect to said radiation source unit, gear means affixed to said displaceable plate and said one of said side walls contiguous to said opening therein and operatively engageable to drive said plate in response to adjustment of said manipulatable means affixed to said portion of said second adjustable rotatable means.

5. The apparatus of claim 3 further comprising an additional adjustable means rotatably borne in an aperture in a minor portion of said bracket plate, an arcuate slot in said one of said side walls aligned with said bracket plate aperture, said further adjustable rotatable means projecting from said bracket plate through said slot, a radiation shield plate depending from an arm secured to said further adjustable means, said shield plate being reciprocally displaceable between first and second positions wherein said shield plate covers over and exposes said block recess, respectively, and additional manipulatable means affixed to a portion of said additional adjustable rotatable means, extending outside said casing.

6. The apparatus of claim 3 wherein said slidable means comprise plates each having first and second flanged portions thereon extending above said casing cover and below said casing opening, respectively, and an arrangement of slots therein, guide means affixed in said end walls and passing within said slots, adjustable means operative in said first flange portions and in said casing cover to shift said plates on said guide means to determine the distance between said units as adjustably disposed in said casing and said second flange portions of said plates.

References Cited

UNITED STATES PATENTS 3,019,338   1/1962   Monaghan et al.
3,270,203   8/1966   Crump.

ARCHIE R. BORCHELT, Primary Examiner

U.S. Cl. X.R.

250—83.3, 108